US012712828B2

(12) United States Patent
Roweth et al.

(10) Patent No.: US 12,712,828 B2
(45) Date of Patent: Aug. 18, 2026

(54) MULTI-PLANE NETWORK SWITCH

(71) Applicant: Hewlett Packard Enterprise Development LP, Spring, TX (US)

(72) Inventors: Duncan Roweth, Bristol (GB); Abdulla M. Bataineh, Seattle, WA (US); Timothy J. Johnson, Madison, WI (US); Jonathan Paul Beecroft, Bristol (GB); Frank R. Dropps, Bloomington, MN (US); David Charles Hewson, Bristol (GB); Anthony M. Ford, Bristol (GB); Trevor Alan Jones, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 376 days.

(21) Appl. No.: 18/480,945

(22) Filed: Oct. 4, 2023

(65) Prior Publication Data

US 2025/0119394 A1 Apr. 10, 2025

(51) Int. Cl.
*H04L 49/00* (2022.01)
*H04L 49/101* (2022.01)

(52) U.S. Cl.
CPC ........ *H04L 49/3018* (2013.01); *H04L 49/101* (2013.01); *H04L 49/3027* (2013.01)

(58) Field of Classification Search
CPC ............... H04L 49/101; H04L 49/3018; H04L 49/3027
USPC .......................................................... 370/329
See application file for complete search history.

(56) References Cited

U.S. PATENT DOCUMENTS

| | | | | |
|---|---|---|---|---|
| 8,625,624 B1 * | 1/2014 | Rose | H04L 49/90 370/429 |
| 2001/0021174 A1 * | 9/2001 | Luijten | H04L 49/3018 370/418 |
| 2002/0057712 A1 * | 5/2002 | Moriwaki | H04L 49/101 370/463 |
| 2002/0064154 A1 * | 5/2002 | Sharma | H04L 12/5601 370/386 |
| 2007/0223457 A1 * | 9/2007 | Arikawa | H04L 12/66 370/352 |
| 2020/0177521 A1 * | 6/2020 | Blumrich | H04L 49/3027 |
| 2022/0210094 A1 * | 6/2022 | Bataineh | H04L 49/9005 |
| 2024/0056385 A1 * | 2/2024 | Bataineh | H04L 47/76 |
| 2025/0112876 A1 * | 4/2025 | Roweth | H04L 47/39 |

OTHER PUBLICATIONS

"Understanding CoS Virtual Output Queues (VOQs)," Juniper Networks accessed Aug. 16, 2023, published Apr. 11, 2023, 7 pages.

* cited by examiner

*Primary Examiner* — Robert J Lopata
(74) *Attorney, Agent, or Firm* — Slater Matsil, LLP

(57) ABSTRACT

A network switch includes multiple data crossbars and multiple header planes for controlling the data crossbars. In an example implementation, a device includes: a plurality of header planes, each of the header planes including an input queue, an output queue, a request crossbar connected to the input queue and the output queue, and a grant crossbar connected to the input queue and the output queue; a receiver; and a header plane selector. The header plane selector is configured to: receive a transfer request for a packet from the receiver; select a header plane of the header planes based on a header of the packet; and queue the transfer request at the input queue of the header plane.

20 Claims, 6 Drawing Sheets

200

MULTI-PLANE NETWORK SWITCH

STATEMENT OF GOVERNMENT-FUNDED RESEARCH

This invention was made with Government support under Contract Number H98230-15-D-0022/0003 awarded by the Maryland Procurement Office. The Government has certain rights in this invention.

BACKGROUND

Network switching is a fundamental concept in computer networking that involves the forwarding of data packets between devices within a network. A network switch analyzes an incoming packet's destination and uses this information to make forwarding decisions, thus performing data transmission within the network. Network switches reduce network congestion and improve overall efficiency compared to older hub-based networks. Bandwidth and rate are important factors in network switching performance, as sustained high bandwidth results in faster communication between devices.

BRIEF DESCRIPTION OF THE DRAWINGS

Aspects of the present disclosure are best understood from the following detailed description when read with the accompanying figures.

Corresponding numerals and symbols in the different figures generally refer to corresponding parts unless otherwise indicated. The figures are drawn to clearly illustrate the relevant aspects of the disclosure and are not necessarily drawn to scale.

DETAILED DESCRIPTION

Figure 1:
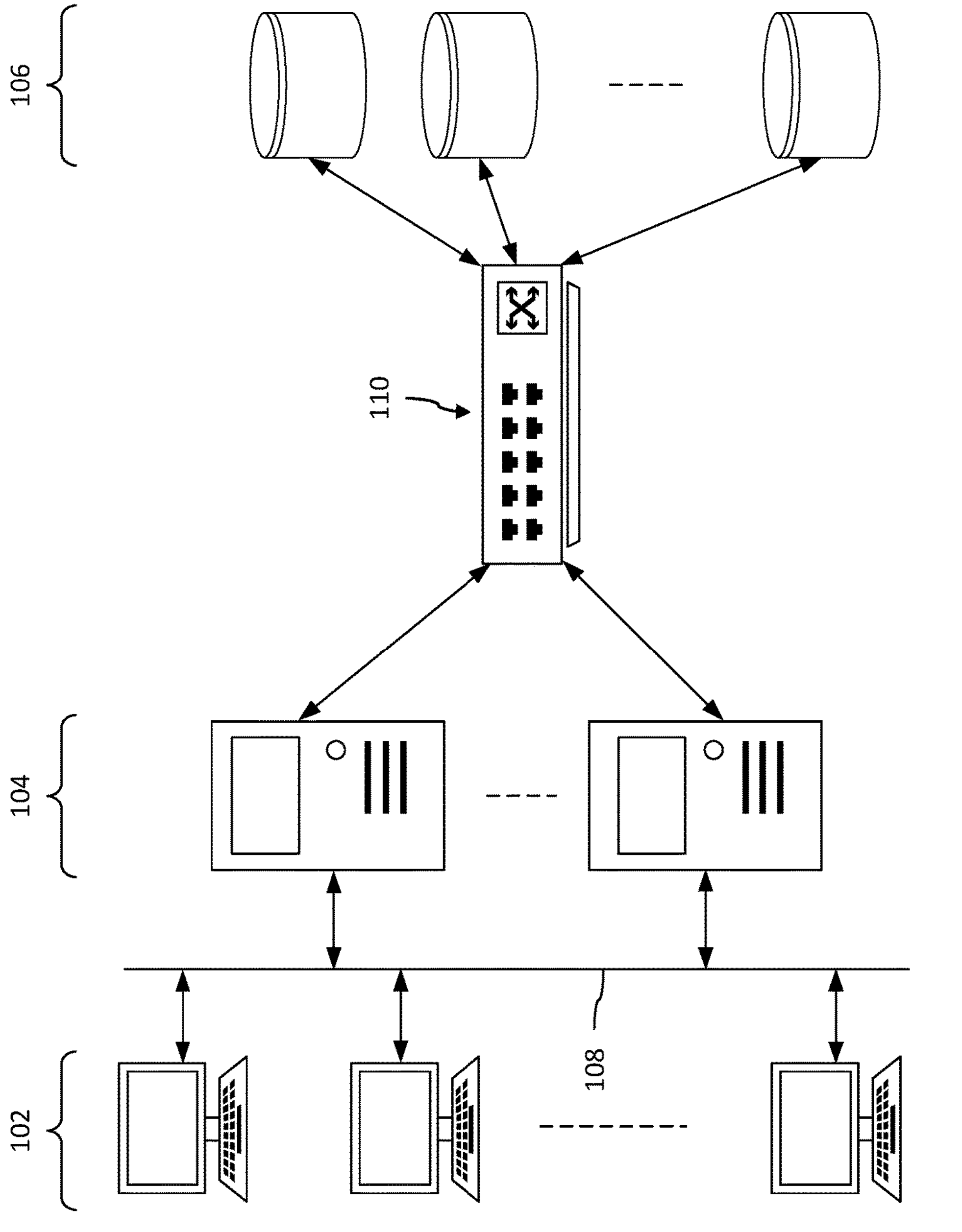
FIG. 1 is a diagram of a network system, according to some implementations.

The following disclosure provides many different examples for implementing different features. Specific examples of components and arrangements are described below to simplify the present disclosure. These are, of course, merely examples and are not intended to be limiting.

Network switches are used for data packet forwarding in local networks. Packets may be large (e.g., in the case of Ethernet frames) or small (e.g., in the case of high performance computing (HPC) network frames). For example, a large packet may be greater than 256 bytes. While network switches may generally operate at line rates when forwarding large packets, they may struggle with maintaining line rates when forwarding small packets. This can be attributed, at least in part, to the impact of clock speeds. Increasing clock speeds is a rudimentary way to maintain line rates when forwarding small packets, but may be infeasible as the demand for higher line rates increases.

The present disclosure describes a network switch that includes multiple data crossbars. Packets are transferred from an input buffer of an input port to an output buffer of an output port over the data crossbars. Specifically, multiple packets are transferred over the data crossbars in parallel. Effectively, multiple packets may be transferred from the input buffer to the output buffer per clock cycle. The quantity of packets transferred per clock cycle may thus be increased as compared to network switches that use a single data crossbar, which allows the overall quantity of transferred packets to be increased without needing to increase clock speeds. The line rate of the network switch may thus be maintained even when dealing with small packets, without the drawbacks of increasing clock speeds.

In an example implementation, each port of a network switch includes components of multiple header planes that control the parallel transfer of packets over the data crossbars. Each header plane may transfer packets independently. Using multiple header planes allows the multiple data crossbars to be more efficiently controlled, which may be advantageous over using a single data crossbar or using multiple data crossbars without multiple header planes. A first header plane of the header planes may control the transfer of a first packet from an input buffer to an output buffer over the data crossbars, while a second header plane of the header planes may control the transfer of a second packet from the input buffer to the output buffer over the data crossbars. The packets may be part of a packet flow, in which case a single header plane of the header planes may control the transfer of the packets from the input buffer to the output buffer over the multiple data crossbars. When transferring a packet, an input queue of a header plane may receive a sequence number for the packet, and may transfer that sequence number along with the packet to the output buffer. The packets may be read from the output buffer and transmitted by the egress port in order of their sequence numbers. In this way, ordering of the packets in the packet flow may be maintained, even if congestion of the data crossbars causes the packets to arrive at the output buffer out of order.

FIG. 1 is a diagram of a network system 100, according to some implementations. The network system 100 may be a high performance network that is part of a high-performance computing (HPC) environment. In the network system 100, client devices 102 act as sending nodes and access servers 104. The servers 104 interact with one another, and may interact with storage devices 106. The servers 104 and/or the storage devices 106 act as receiving nodes and provide software/services to the client devices 102. The servers 104 and/or the storage devices 106 may be part of an HPC cluster. The servers 104 and the storage devices 106 are only examples of devices that may be accessed by the client devices 102.

The client devices 102 interact with the servers 104 via a network 108. The network 108 may be any wired or wireless network that is adapted to facilitate communication between the client devices 102 and the servers 104. The client devices 102 and/or the servers 104 include network interface(s) for accessing the network 108. For example, the client devices 102 and/or the servers 104 may include network interface cards (NICs), wireless interface cards, or the like. The network 108 may include controllers, access points, switches, routers, or the like for forwarding traffic between the client devices 102 and the servers 104. The client devices 102 may be any electronic devices that are adapted to execute executable code. The servers 104 may be bare metal machines that are adapted to host cloud components (e.g., virtual machines, containers, etc.). The storage devices 106 may be network-attached storage (NAS) devices.

The servers 104 and the storage devices 106 are interconnected with each other via one or more network switches, including a network switch 110. The servers 104 and the storage devices 106 communicate with each other via packets that are transferred between sending and receiving nodes. The servers 104 and the storage devices 106 are only examples of devices that may be interconnected via the network switch 110. Other devices may be connected to the network switch 110. The packets may be routed by the network switch 110. The network switch 110 may have a high line rate, such as a line rate of 800 Gbps, 1600 Gbps, or higher. A high line rate may be desirable when the servers 104 and/or the storage devices 106 are part of an HPC cluster. Utilizing a wider data bus or higher clock speed is one technique to increase line rates, however, such techniques may not be suitable when forwarding small packets. As subsequently described in greater detail, the network switch 110 utilizes multiple header planes and multiple data crossbars to allow the network switch 110 to forward multiple packets per clock cycle. Advantageously, this helps the network switch 110 to maintain high line rates even when forwarding small packets.

Figure 2:
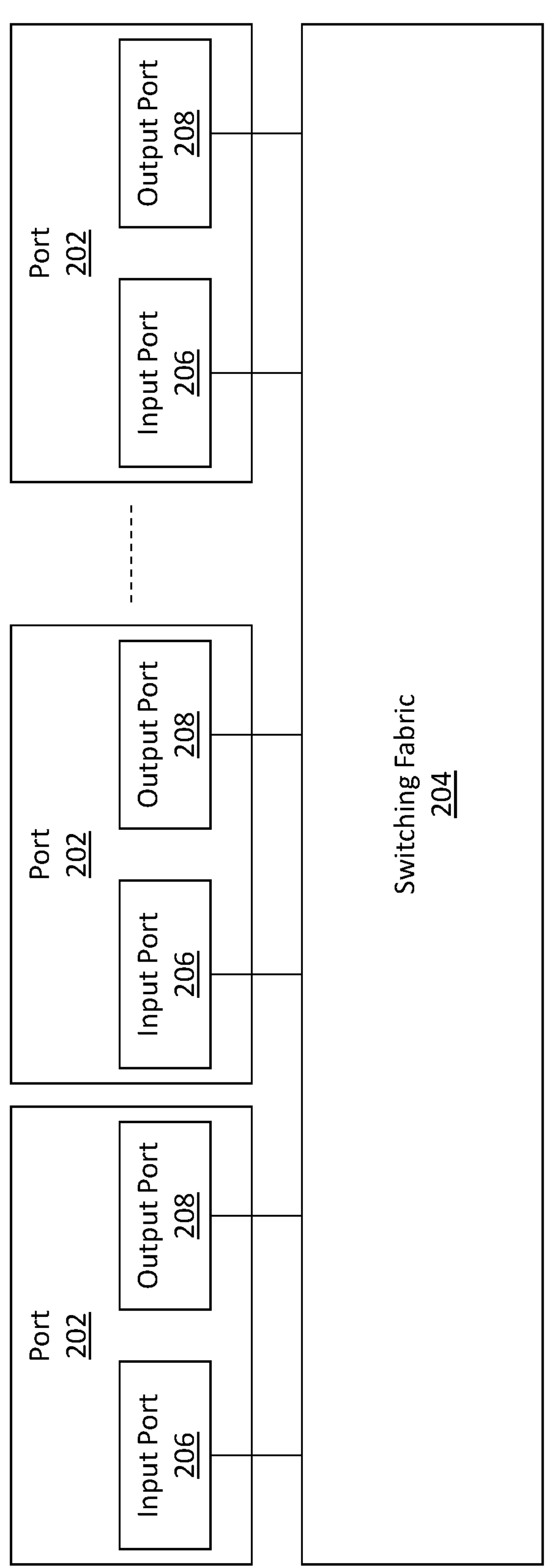
FIG. 2 is a block diagram of a network switch, according to some implementations.

FIG. 2 is a block diagram of a network switch 200, according to some implementations. The network switch 200 is an example of the network switch 110 previously described for FIG. 1. The network switch 200 includes ports 202 and a switching fabric 204. The ports 202 serve as connection points for nodes (e.g., servers, storage devices, etc.). The switching fabric 204 manages and forwards data packets between the ports 202.

Each port 202 includes an input port 206 and an output port 208. The input ports 206 are the ingress points through which packets enter the network switch 200. The output ports 208 are the egress points responsible for transmitting the packets to their designated destinations. When a packet arrives at an input port 206, the network switch 200 examines the packet's destination address to determine the appropriate output port 208 for transmission. This process, known as switching or forwarding, includes performing a lookup in a forwarding table of the network switch 200 to find the forwarding path for the packet.

Each input port 206 receives packets from a node connected to the input port 206, and sends the packets to the output ports 208, in a one-to-many configuration. An input port 206 controls how packets are sent to the output ports 208. Similarly, each output port 208 receives packets from the input ports 206, and sends the packets to a node connected to the output port 208, in a many-to-one configuration. An output port 208 controls how packets are received from the input ports 206.

The ports 202 (including the input ports 206 and the output ports 208) are interconnected via the switching fabric 204, which provides the necessary pathways for packets to move from the input ports 206 to the output ports 208. The switching fabric 204 links the input ports 206 and the output ports 208. Depending on the architecture of the network switch 200, the switching fabric 204 may be based on crossbar matrices, shared buses, shared memory, or the like. In an implementation, the switching fabric 204 includes multiple crossbars which are used for both control and data transmission between the input ports 206 and the output ports 208.

The components of the network switch 200 can be implemented as integrated circuits, such as in one or more integrated circuit die(s) and/or one or more integrated circuit package(s). For example, the network switch 200 may include a processor, an application-specific integrated circuit, a field-programmable gate array, memory, combinations thereof, or the like. One or more modules within the network switch 200 may be partially or wholly embodied as software and/or hardware for performing any functionality described herein. For example, the buffers, queues, crossbars, transmitters, receivers, fabrics, etc. described herein may each be embodied as logic blocks of an integrated circuit. In some implementations, the components of the network switch 200 are implemented across multiple integrated circuit dies/packages, which may be assembled together in a same chassis.

As subsequently described in greater detail, the switching fabric 204 includes multiple data crossbars. Packets are transferred from an input port 206 to an output port 208, in parallel, over the data crossbars of the switching fabric 204. Additionally, each port of the network switch 200 includes components of multiple header planes that control the parallel transfer of packets over the data crossbars. Thus, multiple packets may be transferred from the input port 206 to the output port 208 per clock cycle. The line rate of the network switch 200 may thus be maintained even when the packets are small.

Figure 3:
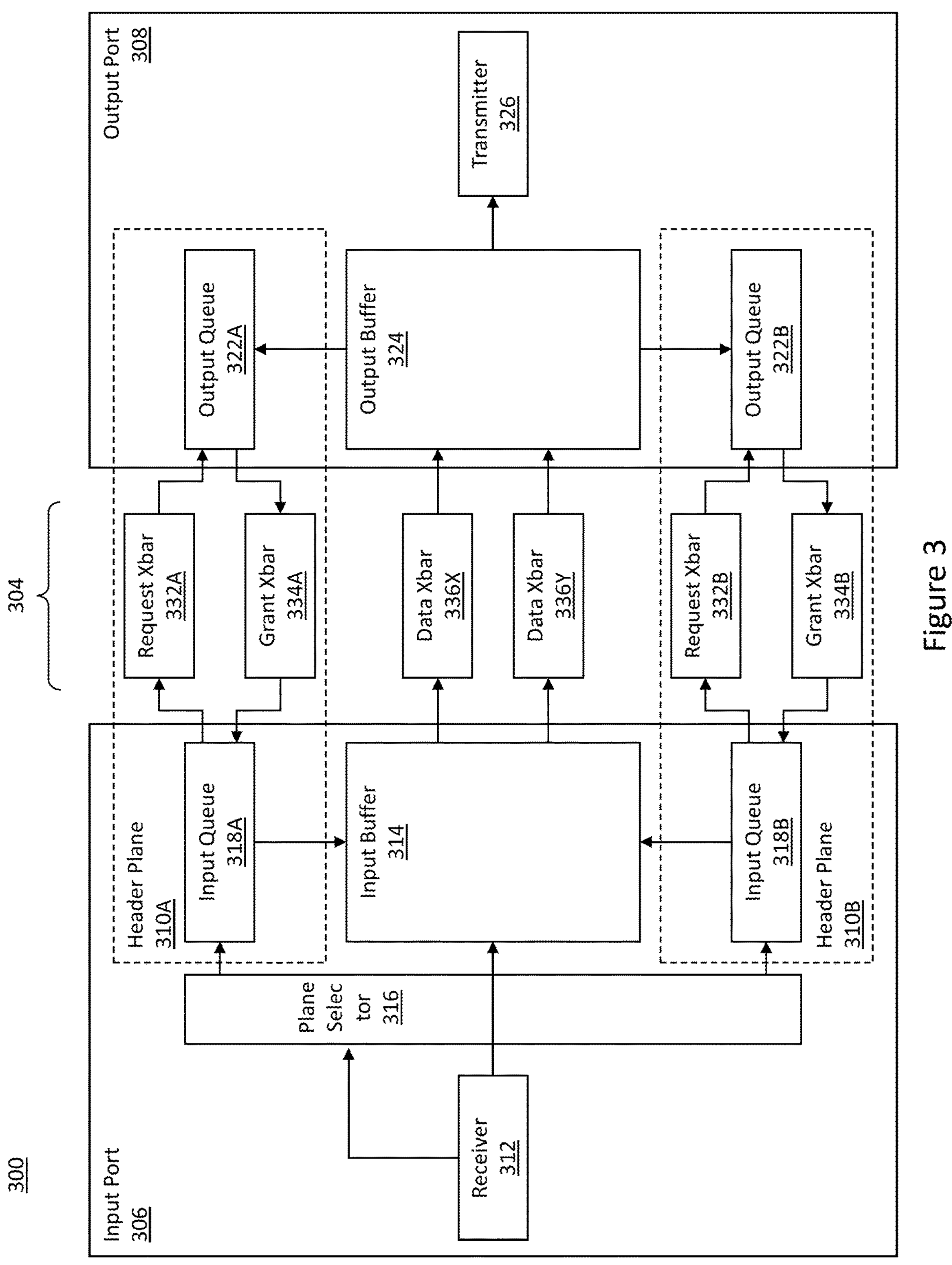
FIG. 3 is a block diagram of a network switch, according to some implementations.

FIG. 3 is a block diagram of a network switch 300, according to some implementations. The network switch 300 is an example of the network switch 200 previously described for FIG. 2. Additional components of the network switch 300 (including components of a switching fabric 304, an input port 306, and an output port 308) are illustrated. The network switch 300 includes multiple header planes 310 (including a first header plane 310A and a second header plane 310B) that control the parallel transfer of packets from the input port 306 to the output port 308. A logical flow during the forwarding of packets from the input port 306 to the output port 308 is shown. Although the forwarding of packets from one input port 306 to one output port 308 will be described, it should be appreciated that each input port 306 may send packets to multiple output ports 308, and each output port 308 may receive packets from multiple input ports 306.

First, components of the network switch 300 will be described. The input port 306 includes a receiver 312, an input buffer 314, a header plane selector 316, and multiple input queues 318 (including a first input queue 318A and a second input queue 318B). The receiver 312 receives packets from a source node that is connected via the input port 306. The packets are destined for a destination node that is connected via the output port 308. The source node and/or the destination node may be directly connected to the network switch 300, or there may be one or more network components (e.g., additional switches) between the network switch 300 and the source/destination node(s). The input buffer 314 is connected to the receiver 312. The received packets are stored in the input buffer 314.

The header plane selector 316 is also connected to the receiver 312. As used herein, a header plane selector 316 is a circuit, firmware, or other component used to select the components of the network switch 300 for controlling the transfer of a packet over a data crossbar. The input queues 318 are each connected to the header plane selector 316 and the input buffer 314. Thus, the input queues 318 are connected to the receiver 312 via the header plane selector 316. Each input queue 318 is an input controller that controls transmitting of the packets from the input buffer 314 to output buffers of the various output ports 308. Requests to send packets to the various output ports 308 are queued at the input queues 318 by the receiver 312. Each input queue 318 arbitrates among its queued requests and selects a request to process. As subsequently described in greater detail, the header plane selector 316 load balances requests across the input queues 318. An input queue 318 determines which output port 308 a packet for a selected request should be forwarded to. For example, an Ethernet lookup unit (not separately illustrated) may extract appropriate header(s) from the packet and use them to perform address translation for the destination node of the packet. An input queue 318 may receive the lookup result from the Ethernet lookup unit.

The output port 308 includes multiple output queues 322 (including a first output queue 322A and a second output queue 322B), an output buffer 324, and a transmitter 326. Each output queue 322 is an output controller that controls receiving of packets in the output buffer 324 from input buffers of the various input ports 306. Requests to receive packets from the various input ports 306 are queued at the output queues 322. Each output queue 322 arbitrates among its queued requests and selects a request to process. The output buffer 324 is connected to the output queues 322. The received packets are stored in the output buffer 324. The transmitter 326 is connected to the output buffer 324. The transmitter 326 reads packets from the output buffer 324 and transmits the packets to their destination nodes. Thus, by controlling the receiving of packets in the output buffer 324, an output queue 322 effectively controls reading of the packets from the output buffer 324 by the transmitter 326.

The network switch 300 may support packet pulling. Packet pulling, such as Virtual Output Queueing (VOQ), is an architectural technique that allows network switches to maintain line rates under congestion by reducing head-of-line blocking. An input queue 318 may maintain a virtual queue for each of the output ports 308. As a result, if congestion occurs at an output port 308, the virtual queue for that output port 308 may be blocked, but the virtual queues for other output ports 308 may continue being processing. Thus, congestion management and/or traffic shaping properties may be supported by the network switch 300.

The switching fabric 304 includes multiple crossbars that are separate from one another. In this example, the switching fabric 304 includes multiple request crossbars 332 (including a first request crossbar 332A and a second request crossbar 332B), multiple grant crossbars 334 (including a first grant crossbar 334A and a second grant crossbar 334B), and multiple data crossbars 336 (including a first data crossbar 336X and a second data crossbar 336Y). A request crossbar 332 and a grant crossbar 334 are connected to an input queue 318 of each input port 306, and to a corresponding output queue 322 of each output port 308. As subsequently described in greater detail, transfer requests will be sent over the request crossbars 332, while transfer grants will be sent over the grant crossbars 334. The data crossbars 336 are connected to the input buffer 314 of each input port 306, and to the output buffer 324 of each output port 308. As subsequently described in greater detail, packets will be transferred over the data crossbars 336.

The data crossbars 336 may each be the same width (thus providing the same bandwidth), or may have different widths. In some implementations, the data crossbars 336 includes first data crossbar(s) of a first (e.g., small) width and second data crossbar(s) of a second (e.g., large) width. The first data crossbars 336 may be used to forward small packets (needing less bandwidth) while the second data crossbars 336 may be used to forward large packets (needing higher bandwidth).

The network switch 300 includes multiple header planes 310 (including a first header plane 310A and a second header plane 310B) for controlling the transfer of packets from the input port 306 to the output port 308. The first header plane 310A controls the transfer of first packets from the input buffer 314 to the output buffer 324 over one of the data crossbars 336, while the second header plane 310B controls the transfer of second packets from the input buffer 314 to the output buffer 324 over another of the data crossbars 336. The first header plane 310A may transfer packets independently of the second header plane 310B. The output queues 322 of the header planes 310 may coordinate traffic shaping via crediting.

The first header plane 310A includes the first input queue 318A of each input port 306, the first output queue 322A of each output port 308, the first request crossbar 332A, and the first grant crossbar 334A. The first request crossbar 332A and the first grant crossbar 334A are connected to the first input queue 318A of each input port 306 and to the first output queue 322A of each output port 308. The first header plane 310A handles first requests to transfer first packets from the from the input buffer 314 to the output buffer 324. Either of the first data crossbar 336X or the second data crossbar 336Y may be used by the first header plane 310A to transfer a packet. As subsequently described in greater detail, the selection of a data crossbar 336 by the first header plane 310A for packet transfer may be based on the load of the data crossbars 336.

The second header plane 310B includes the second input queue 318B of each input port 306, the second output queue 322B of each output port 308, the second request crossbar 332B, and the second grant crossbar 334B. The second request crossbar 332B and the second grant crossbar 334B are connected to the second input queue 318B of each input port 306 and to the second output queue 322B of each output port 308. The second header plane 310B handles second requests to transfer second packets from the from the input buffer 314 to the output buffer 324. Either of the first data crossbar 336X or the second data crossbar 336Y may be used by the second header plane 310B to transfer a packet. As subsequently described in greater detail, the selection of a data crossbar 336 by the second header plane 310B for packet transfer may be based on the load of the data crossbars 336.

The header plane selector 316 load balances requests from the receiver 312 across the header planes 310. When the receiver 312 stores a packet in the input buffer 314, it also sends a request to the header plane selector 316. The header plane selector 316 selects one of the header planes 310 to handle the request. The request is then forwarded to the input queue 318 of the selected header plane 310. The header plane selector 316 may include a first-in-first-out (FIFO) buffer for queueing requests before they are distributed to the header planes 310. Because multiple packets are forwarded per clock cycle, the FIFO buffer of the header plane selector 316 is large, e.g., deep enough to hold requests for a burst of packets. In some implementations, the FIFO buffer of the header plane selector 316 is deep enough to hold two requests per header plane 310.

A logical flow for the forwarding of packets from the input port 306 to the output port 308 will now be described. The receiver 312 receives a packet and stores the packet in the input buffer 314. A request to transfer the packet is sent to the header plane selector 316. The header plane selector 316 selects a header plane 310. Criteria for header plane selection will be subsequently described. The header plane selector 316 then queues the request at the input queue 318 of the selected header plane 310, which then selects the request for processing. The input queue 318 sends a transfer request for the packet to the output queue 322 of the selected header plane 310, over the request crossbar 332 of the selected header plane 310. The transfer request includes a description of the packet; for example, the request may include information from a header of the packet.

The transfer request is queued at the output queue 322 of the selected header plane 310, which then selects the transfer request for processing. The output queue 322 decides whether and when to grant the transfer request. For example, the output queue 322 may decide which transfer request to grant next based on the packet descriptions of the transfer requests, and based on the current state of the output buffer 324. In response to the transfer request being granted, the output queue 322 sends a transfer grant to the input queue 318 over the grant crossbar 334 of the selected header plane 310.

The transfer grant is a notification that instructs the input queue 318 to move the packet from the input buffer 314 to the output buffer 324. In response to receiving the transfer grant, the input queue 318 selects a data crossbar 336, and then transfers the packet from the input buffer 314 to the output buffer 324 over the selected data crossbar 336. Criteria for data crossbar selection will be subsequently described. The transmitter 326 then reads the packet from the output buffer 324. Thus, the output queues 322 control the reading of packets by the transmitter 326 (and thus determine which packets are sent via the transmitter 326) by the granting of the transfer request.

Packets are transferred over the data crossbars 336 in parallel. For example, a first packet and a second packet may both be transferred from the input buffer 314 to the output buffer 324 over the data crossbars 336. The first packet may be transferred over the first data crossbar 336X in parallel with the second packet being transferred over the second data crossbar 336Y. Because the data crossbars 336 are connected to each input buffer 314 and to each output buffer 324, the packets sent in parallel over the data crossbars 336 may be sent to the same output (as in this example) or to different outputs. A data crossbar 336 may be selected by an input queue 318 or other module based on the load of the data crossbars 336. For example, an input queue 318 or other module may select whichever data crossbar 336 has the fewest pending transfer requests. Additionally, an input queue 318 or other module may select different data crossbars 336 for different packet transfers. For example, the input queue 318 or other module may select the first data crossbar 336X for a first packet transfer and then select the second data crossbar 336Y for a second packet transfer.

When a header plane 310 is selected (by the header plane selector 316) to handle a request to transfer a packet, that request may traverse the selected header plane 310 without switching to another header plane 310 partway through processing. For example, if the first header plane 310A is selected by the header plane selector 316, then the first input queue 318A sends the transfer request to the first output queue 322A over first request crossbar 332A, and the first output queue 322A sends the transfer grant to the first input queue 318A over the first grant crossbar 334A. Similarly, if the second header plane 310B is selected by the header plane selector 316, then the second input queue 318B sends the transfer request to the second output queue 322B over second request crossbar 332B, and the second output queue 322B sends the transfer grant to the second input queue 318B over the second grant crossbar 334B.

The header plane selector 316 may select a header plane 310 based on one or more criteria. In some implementations, request are distributed to the header planes 310 to accomplish load balancing. For example, the requests may be distributed in a round-robin manner. In some implementations, requests for all packets of a particular frame type may be distributed to a particular header plane 310. For example, one header plane 310 may be used for all Ethernet frame requests, while another header plane 310 may be used for all HPC network frame requests. In some implementations, a header plane 310 is selected based on one or more header(s) of a packet. For example, the same header plane 310 may be used for all packets of a same packet flow. One or more fields in the header(s) may be hashed to calculate a flow hash, which is an integer value. Examples of packet header fields that may be hashed include the source MAC/IP address, the destination MAC/IP address, the flow label, etc. The header plane selector 316 may then select a header plane 310 based on the flow hash. Each packet of a packet flow may have the same flow hash, and in this way, the same header plane 310 will be selected for each packet of the packet flow. As subsequently described, using the same header plane 310 for each packet of a packet flow helps ensure the packets maintain proper ordering. The criteria used for selecting a header plane 310 for a packet request may depend on whether the packet is an ordered or unordered packet. For example, unordered packet requests may be distributed to the header planes 310 in a round-robin manner, while ordered packet requests may be distributed to the header planes 310 based on information contained in the headers of the packets. Other variations are contemplated. For example, the header plane 310 may be selected based on the contents of the packet itself (which may be evaluated via deep packet inspection), alone or in addition to any of the aforementioned criteria.

A packet flow may be forwarded from the input port 306 to the output port 308. A packet flow is an ordered sequence of packets. When a packet flow is forwarded, a single header plane 310 is used to control the forwarding of each packet of the packet flow. The single header plane 310 forwards the packets of the packet flow using multiple data crossbars 336. The ordering of the packets in a packet flow should be maintained when forwarding the packet flow, such that the transmitter 326 reads the packets of the packet flow from the output buffer 324 in the desired order. However, when the packets of a packet flow are forwarded using multiple data crossbars 336, packets of the packet flow may arrive at the output port 308 out of order as a result of congestion in the switching fabric 304.

The same header plane 310 may be used to handle each request to transfer a packet of a packet flow. Thus, all transfer requests for a packet flow may traverse a selected header plane 310 without switching to another header plane 310 partway through processing. When handling ordered packet requests, the header plane 310 is selected based on information contained in the headers of the packets. Specifically, a flow hash is computed (as previously described) for the packets of the packet flow. The packets of the packet flow may each have the same flow hash. The header plane selector 316 distributes requests with the same flow hash to the same header plane 310. Thus, the transfer of all packets for a packet flow are controlled by the same header plane 310.

In some implementations, the output queue 322 of the selected header plane 310 assigns a sequence number to each packet of a packet flow based on the ordering of the packets in the packet flow. Specifically, each output queue 322 assigns sequence numbers to transfer requests for packets of a packet flow in the order the requests are received. Each output queue 322 may have a sequencer (or counter) for each input port 306, and each time the output queue 322 grants a transfer request, it uses the value of the sequencer as the sequence number and increments the sequencer. When an output queue 322 grants a transfer request, the transfer grant sent to the input queue 318 of the selected header plane 310 includes the sequence number for that request's packet. The sequence number for the packet is included with the packet when it is transferred from the input buffer 314 to the output buffer 324. Both the packet and the sequence number for the packet are stored in the output buffer 324. The transmitter 326 reads the packets from the output buffer 324 in the order of their sequence numbers. For example, when the output buffer 324 contains both a first packet and a second packet of a packet flow, the packet with a lower sequence number may be read from the output buffer 324 before the packet with a higher sequence number. Thus, the transmitter 326 reads the packets of the packet flow from the output buffer 324 in the desired order, even when the packets are transferred to the output buffer 324 out of order.

When handling a request for an unordered packet, the output queue 322 of the selected header plane 310 may indicate to the input queue 318 of the selected header plane 310 that the packet is an unordered packet (e.g., is not a sequenced packet). For example, the output queue 322 may assign a dummy sequence number to the packet. The dummy sequence number may be a predetermined value that indicates the packet is not part of a flow. When a packet in the output buffer 324 has the dummy sequence number, the transmitter 326 may read that packet from the output buffer 324 whenever desired.

Figure 4:
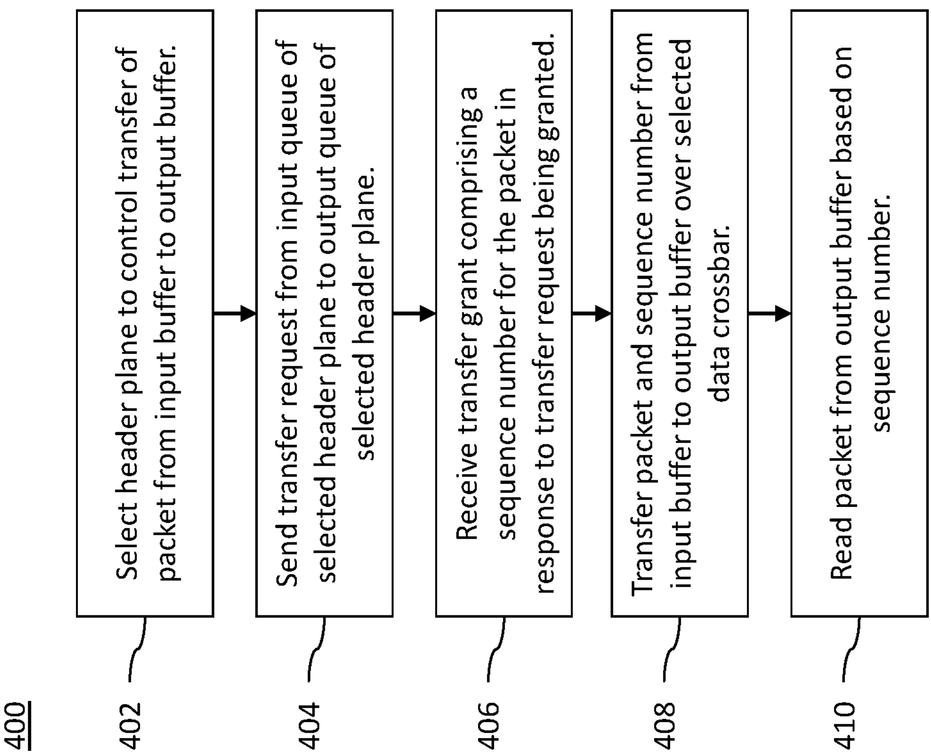
FIG. 4 is a diagram of a packet forwarding method, according to some implementations.

FIG. 4 is a diagram of a packet forwarding method 400, according to some implementations. The packet forwarding method 400 will be described in conjunction with FIG. 3. The packet forwarding method 400 may be performed by the network switch 300 during the forwarding of a packet from an input port 306 to an output port 308.

The network switch 300 performs a step 402 of selecting a header plane, the header plane controlling transfer of a packet from an input buffer to an output buffer, the header plane comprising an input queue and an output queue. Specifically, the selected header plane 310 controls transfer of a packet from an input buffer 314 to an output buffer 324. The selected header plane 310 includes an input queue 318 and an output queue 322. The packet is stored in the input buffer 314 by the receiver 312. The header plane selector 316 selects the selected header plane 310 based on the aforementioned criteria, such as the frame type and/or header of the packet. As part of header plane selection, the header plane selector 316 may calculate a flow hash for the packet by hashing fields in a header of the packet. The fields may be any of aforementioned fields.

The network switch 300 performs a step 404 of sending a transfer request from the input queue of the header plane to the output queue of the header plane. Specifically, a transfer request is sent from the input queue 318 of the selected header plane 310 to the output queue 322 of the selected header plane 310. The transfer request may include a description of the packet, such as information from the header of the packet.

The network switch 300 performs a step 406 of receiving a transfer grant from the output queue of the header plane at the input queue of the header plane, the transfer grant comprising a sequence number for the packet. Specifically, a transfer grant is received from the output queue 322 of the selected header plane 310, at the input queue 318 of the selected header plane 310. The output queue 322 sends the transfer grant to the input queue 318 in response to its granting of the transfer request. When the transfer request includes a description of the packet, the output queue 322 may grant the transfer request based on the description of the packet. The transfer grant may include a sequence number for the packet. The sequence number may be assigned as previously described. If the packet is an unordered packet (e.g., not part of a packet flow), the sequence number may be a dummy sequence number. If the packet is an ordered packet (e.g., part of a packet flow), the sequence number may be assigned to the packet based on ordering of the packet in the packet flow. The transfer request for the packet may indicate whether it is an ordered or unordered packet. The output queue 322 may assign the sequence number based on the order in which it receives requests. Since the requests are sent to the output queue 322 in their order in the packet flow, the sequence numbers may be naturally assigned to the packets in order.

The network switch 300 performs an optional step of selecting a data crossbar 336 from the multiple data crossbars 336 of the switching fabric 304. The selected data crossbar 336 may be selected based on a load of the selected data crossbar 336, as previously described.

The network switch 300 performs a step 408 of transferring the packet and the sequence number from the input buffer to the output buffer. Specifically, the packet and the sequence number of the packet are transferred from the input buffer 314 to the output buffer 324. The packet and its sequence number may be transferred over the previously selected data crossbar 336.

The network switch 300 performs a step 410 of reading the packet from the output buffer based on the sequence number. Specifically, the packet is read from the output buffer 324 based on the sequence number of the packet. The transmitter 326 reads the packet from the output buffer 324. When the packet is part of a packet flow, the packets of the packet flow are read from the output buffer 324 in order of their sequence numbers. When the packet is an unordered packet, the packet may be read whenever desired by the transmitter 326.

Figure 5:
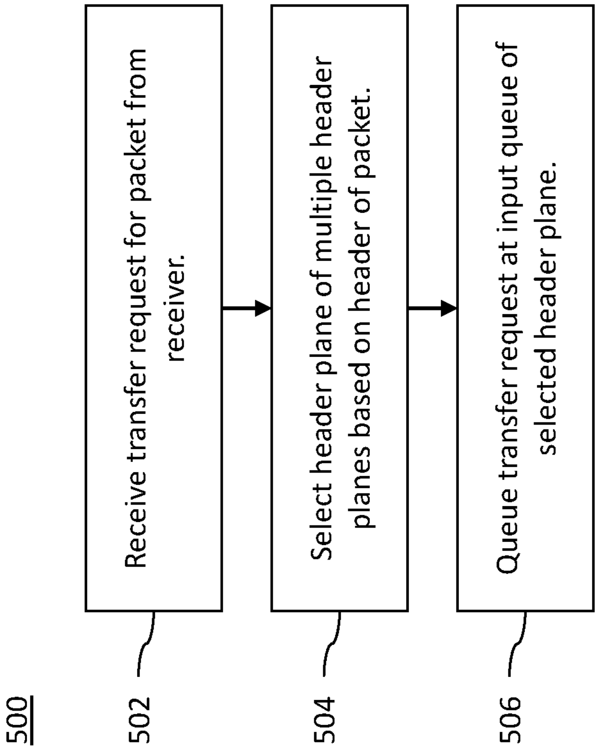
FIG. 5 is a diagram of a plane selection method, according to some implementations.

FIG. 5 is a diagram of a plane selection method 500, according to some implementations. The plane selection method 500 will be described in conjunction with FIG. 3. The plane selection method 500 may be performed by the network switch 300 (particularly, the header plane selector 316) to control forwarding of a received packet.

The network switch 300 performs a step 502 of receiving a transfer request for a packet from the receiver 312. The receiver 312 may send the transfer request to the header plane selector 316 when the receiver 312 stores the received packet in the input buffer 314.

The network switch 300 performs a step 504 of selecting a header plane 310 of the header planes 310 based on one or more header(s) of the packet. For example, the header plane 310 may be selected by calculating a flow hash for the packet by hashing field(s) in the header(s) of the packet, and then selecting the header plane 310 based on the flow hash. The header field(s) of the packet that are hashed may be from the Ethernet header, IP header, TCP/UDP header, combinations thereof, and the like. If the packet is an encapsulated packet, then the header field(s) that are hashed may be from the encapsulation header, as well as from the inner header of the encapsulated packet. The header plane 310 may also be selected based on others of the aforementioned criteria, such as the frame type of the packet.

The network switch 300 performs a step 506 of queueing the transfer request at the input queue 318 of the selected header plane 310. The transfer request may then be sent to the output queue 322 of the selected header plane 310. Subsequently, a transfer grant may be sent back to the input queue 318 of the selected header plane 310, which may then transfer the packet to the output buffer 324 over one of the data crossbars 336, as previously described.

The techniques of the present disclosure may achieve advantages. By utilizing multiple data crossbars 336 for packet transfer, multiple packets may be transferred over the data crossbars 336 in parallel, which may allow for increased performance as compared to using a single data crossbar. As such, multiple packets may be transferred from the input buffer 314 to the output buffer 324 per clock cycle. The line rate of the network switch 300 may thus be maintained even when forwarding small packets, including ordered and unordered packets. Utilizing multiple header planes 310 allows the parallel transfer of packets over the data crossbars 336 to be independently controlled. Packet flow(s) may be spread over multiple data crossbars 336, at the packet level, for forwarding of the packet flow(s).

In the forgoing examples, the network switch 300 is described as having two data crossbars 336 and two header planes 310. However, it should be appreciated that the network switch 300 may have any desired quantity of data crossbars 336 and any desired quantity of header planes 310. Specifically, the network switch 300 may include more data crossbars 336 and/or more header planes 310 than previously described, which may allow for even more packets to be transferred per clock cycle. Additionally, the switching techniques described herein may be applicable to other types of networking, such as wireless networking.

Figure 6:
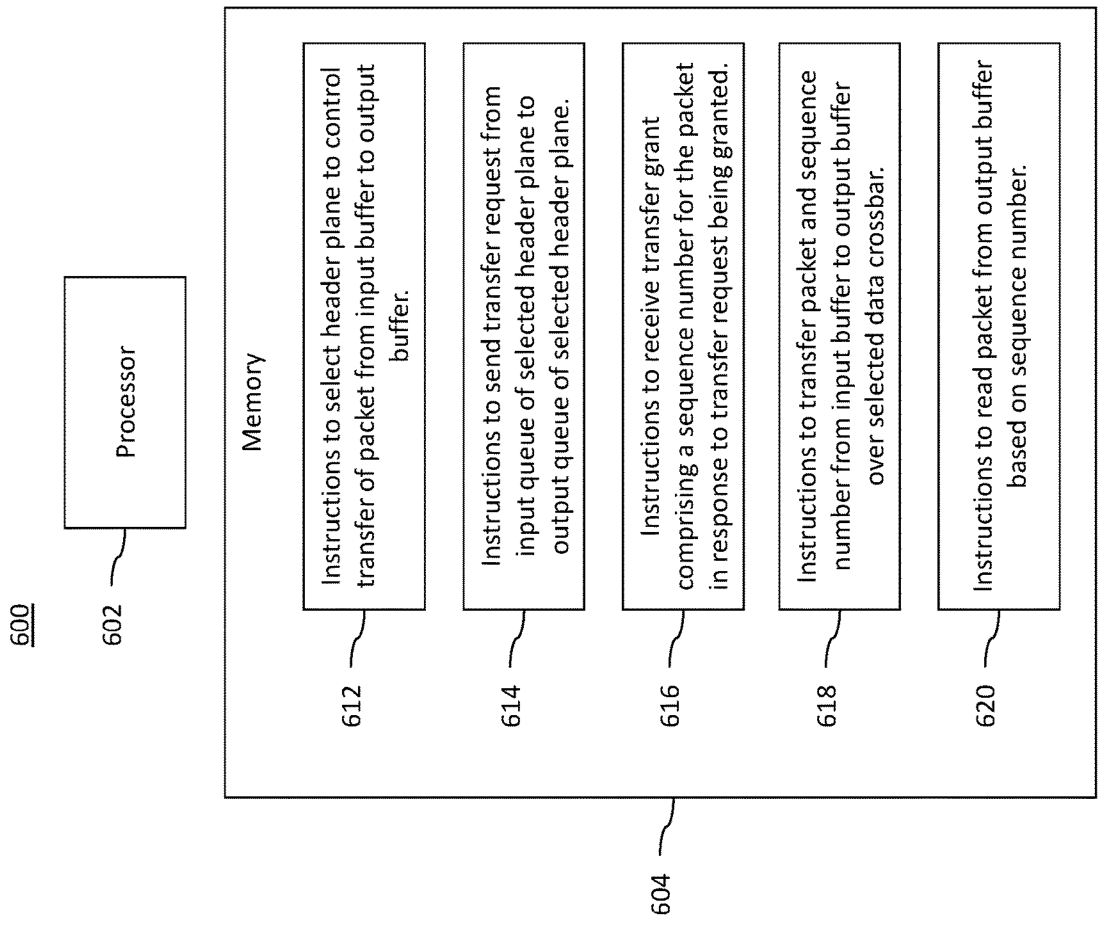
FIG. 6 is a block diagram of a network switch, according to some implementations.

FIG. 6 is a block diagram of a network switch 600, according to some implementations. The network switch 600 is an example of the network switch 200 previously described for FIG. 2. The network switch 600 may include a processor 602 and a memory 604. The memory 604 may be a non-transitory computer readable medium that stores programming for execution by the processor. In this implementation, one or more modules within the network switch 600 may be partially or wholly embodied as software for performing any functionality described herein. For example, the memory 604 may include: instructions 612 to select a header plane, the header plane controlling transfer of a packet from an input buffer to an output buffer, the header plane comprising an input queue and an output queue; instructions 614 to send a transfer request from the input queue of the header plane to the output queue of the header plane; instructions 616 to receive a transfer grant from the output queue of the header plane at the input queue of the header plane, the transfer grant comprising a sequence number for the packet; instructions 618 to transfer the packet and the sequence number from the input buffer to the output buffer; and instructions 620 to read the packet from the output buffer based on the sequence number.

In an example implementation, a device includes: an output buffer; a first data crossbar connected to the output buffer; a second data crossbar connected to the output buffer, the second data crossbar separate from the first data crossbar; an input buffer connected to the first data crossbar and to the second data crossbar; a first input queue configured to transfer a first packet from the input buffer to the output buffer over the first data crossbar; and a second input queue configured to transfer a second packet from the input buffer to the output buffer over the second data crossbar. In some implementations of the device, the first packet is transferred over the first data crossbar in parallel with the second packet being transferred over the second data crossbar. In some implementations, the device further includes: a header plane selector configured to distribute a first transfer request for the first packet to the first input queue and to distribute a second transfer request for the second packet to the second input queue. In some implementations of the device, the header plane selector distributes the first transfer request and the second transfer request based on a first header of the first packet and on a second header of the second packet. In some implementations of the device, the header plane selector distributes the first transfer request and the second transfer request based on a first frame type of the first packet and on a second frame type of the second packet. In some implementations of the device, the first packet is part of a packet flow, and the first input queue is further configured to transfer each packet of the packet flow from the input buffer to the output buffer. In some implementations, the device further includes: a first output queue configured to receive a first transfer request for the first packet from the first input queue, and to send a first transfer grant to the first input queue; and a second output queue configured to receive a second transfer request for the second packet from the second input queue, and to send a second transfer grant to the second input queue. In some implementations, the device further includes: a first request crossbar connected to the first input queue and the first output queue, the first input queue configured to send the first transfer request to the first output queue over the first request crossbar; a second request crossbar connected to the second input queue and the second output queue, the second request crossbar separate from the first request crossbar, the second input queue configured to send the second transfer request to the second output queue over the second request crossbar; a first grant crossbar connected to the first input queue and the first output queue, the first output queue configured to send the first transfer grant to the first input queue over the first grant crossbar; and a second grant crossbar connected to the second input queue and the second output queue, the second grant crossbar separate from the first grant crossbar, the second output queue configured to send the second transfer grant to the second input queue over the second grant crossbar. In some implementations of the device, the first transfer grant includes a first sequence number, the first output queue includes a first sequencer configured to generate the first sequence number, the second transfer grant includes a second sequence number, and the second output queue includes a second sequencer configured to generate the second sequence number.

In an example implementation, a device includes: a plurality of header planes, each of the header planes including an input queue, an output queue, a request crossbar connected to the input queue and the output queue, and a grant crossbar connected to the input queue and the output queue; a receiver; and a header plane selector configured to: receive a transfer request for a packet from the receiver; select a header plane of the header planes based on a header of the packet; and queue the transfer request at the input queue of the header plane. In some implementations of the device, the input queue is configured to send the transfer request to the output queue over the request crossbar, and the output queue is configured to send a transfer grant to the input queue over the grant crossbar. In some implementations of the device, the header plane selector is configured to select the header plane by calculating a flow hash for the packet by hashing fields in the header of the packet, the header plane being selected based on the flow hash.

In an example implementation, a method includes: selecting a header plane, the header plane controlling transfer of a packet from an input buffer to an output buffer, the header plane including an input queue and an output queue; sending a transfer request from the input queue of the header plane to the output queue of the header plane; receiving a transfer grant from the output queue of the header plane at the input queue of the header plane, the transfer grant including a sequence number for the packet; transferring the packet and the sequence number from the input buffer to the output buffer; and reading the packet from the output buffer based on the sequence number. In some implementations, the method further includes: calculating a flow hash for the packet by hashing fields in a header of the packet, the header plane being selected based on the flow hash. In some implementations of the method, the header plane is selected based on a frame type of the packet. In some implementations of the method, the transfer request includes a description of the packet, and the transfer request is granted by the output queue based on the description of the packet. In some implementations of the method, the packet is an unordered packet, and the sequence number is a dummy sequence number. In some implementations of the method, the packet is part of a packet flow, the sequence number is assigned to the packet based on ordering of the packet in the packet flow, and a plurality of data crossbars are used to transfer each packet of the packet flow from the input buffer to the output buffer. In some implementations, the method further includes: selecting a data crossbar from a plurality of data crossbars, wherein transferring the packet and the sequence number from the input buffer to the output buffer comprises transferring the packet and the sequence number over the data crossbar. In some implementations of the method, the data crossbar is selected based on a load of the data crossbar. The method may be implemented as instructions stored on a non-transitory computer readable medium.

The foregoing outlines features of several examples so that those skilled in the art may better understand the aspects of the present disclosure. Various modifications and combinations of the illustrative examples, as well as other examples, will be apparent to persons skilled in the art upon reference to the description. It is therefore intended that the appended claims encompass any such modifications.

What is claimed is:

1. A device comprising:

an output buffer;

a first data crossbar connected to the output buffer;

a second data crossbar connected to the output buffer, the second data crossbar separate from the first data crossbar;

an input buffer connected to the first data crossbar and to the second data crossbar;

a first input queue configured to transfer a first packet from the input buffer to the output buffer over the first data crossbar; and a second input queue configured to transfer a second packet from the input buffer to the output buffer over the second data crossbar.

2. The device of claim 1, wherein the first packet is transferred over the first data crossbar in parallel with the second packet being transferred over the second data crossbar.

3. The device of claim 1, further comprising:

a header plane selector configured to distribute a first transfer request for the first packet to the first input queue and to distribute a second transfer request for the second packet to the second input queue.

4. The device of claim 3, wherein the header plane selector distributes the first transfer request and the second transfer request based on a first header of the first packet and on a second header of the second packet.

5. The device of claim 3, wherein the header plane selector distributes the first transfer request and the second transfer request based on a first frame type of the first packet and on a second frame type of the second packet.

6. The device of claim 1, wherein the first packet is part of a packet flow, and the first input queue is further configured to transfer each packet of the packet flow from the input buffer to the output buffer.

7. The device of claim 1, further comprising:

a first output queue configured to receive a first transfer request for the first packet from the first input queue, and to send a first transfer grant to the first input queue; and a second output queue configured to receive a second transfer request for the second packet from the second input queue, and to send a second transfer grant to the second input queue.

8. The device of claim 7, further comprising:

a first request crossbar connected to the first input queue and the first output queue, the first input queue configured to send the first transfer request to the first output queue over the first request crossbar;

a second request crossbar connected to the second input queue and the second output queue, the second request crossbar separate from the first request crossbar, the second input queue configured to send the second transfer request to the second output queue over the second request crossbar;

a first grant crossbar connected to the first input queue and the first output queue, the first output queue configured to send the first transfer grant to the first input queue over the first grant crossbar; and a second grant crossbar connected to the second input queue and the second output queue, the second grant crossbar separate from the first grant crossbar, the second output queue configured to send the second transfer grant to the second input queue over the second grant crossbar.

9. The device of claim 7, wherein the first transfer grant comprises a first sequence number, the first output queue comprises a first sequencer configured to generate the first sequence number, the second transfer grant comprises a second sequence number, and the second output queue comprises a second sequencer configured to generate the second sequence number.

10. A device comprising:

a plurality of header planes, each of the header planes comprising an input queue, an output queue, a request crossbar connected to the input queue and the output queue, and a grant crossbar connected to the input queue and the output queue;

a receiver; and a header plane selector configured to:

receive a transfer request for a packet from the receiver;

select a header plane by calculating a flow hash for the packet by hashing fields in a header of the packet, the header plane being selected based on the flow hash; and queue the transfer request at the input queue of the header plane.

11. The device of claim 10, wherein the input queue is configured to send the transfer request to the output queue over the request crossbar, and the output queue is configured to send a transfer grant to the input queue over the grant crossbar.

12. A method comprising:

selecting a header plane, the header plane controlling transfer of a packet from an input buffer to an output buffer, the header plane comprising an input queue and an output queue;

calculating a flow hash for the packet by hashing fields in a header of the packet, the header plane being selected based on the flow hash;

sending a transfer request from the input queue of the header plane to the output queue of the header plane;

receiving a transfer grant from the output queue of the header plane at the input queue of the header plane, the transfer grant comprising a sequence number for the packet;

transferring the packet and the sequence number from the input buffer to the output buffer; and reading the packet from the output buffer based on the sequence number.

13. The method of claim 12, wherein the header plane is selected based on a frame type of the packet.

14. The method of claim 12, wherein the transfer request comprises a description of the packet, and the transfer request is granted by the output queue based on the description of the packet.

15. The method of claim 12, wherein the packet is an unordered packet, and the sequence number is a dummy sequence number.

16. The method of claim 12, wherein the packet is part of a packet flow, the sequence number is assigned to the packet based on ordering of the packet in the packet flow, and a plurality of data crossbars are used to transfer each packet of the packet flow from the input buffer to the output buffer.

17. The method of claim 12, further comprising:

selecting a data crossbar from a plurality of data crossbars, wherein transferring the packet and the sequence number from the input buffer to the output buffer comprises transferring the packet and the sequence number over the data crossbar.

18. The method of claim 17, wherein the data crossbar is selected based on a load of the data crossbar.

19. The device of claim 10, wherein the transfer request comprises a description of the packet.

20. The device of claim 11, wherein the transfer grant comprises a sequence number for the packet.

* * * * *